(12) United States Patent
Haik-Beraud et al.

(10) Patent No.: US 8,966,937 B2
(45) Date of Patent: Mar. 3, 2015

(54) PROCESS FOR GENERATING AND SEPARATING A HYDROGEN-CARBON MONOXIDE MIXTURE BY CRYOGENIC DISTILLATION

(75) Inventors: Natacha Haik-Beraud, Champigny-sur-Marne (FR); Antoine Hernandez, Chatenay Malabry (FR); Pascal Marty, Bry sur Marne (FR); Bernd Polster, Frankfurt am Main (DE)

(73) Assignee: L'Air Liquide Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 760 days.

(21) Appl. No.: 13/057,001

(22) PCT Filed: Jul. 20, 2009

(86) PCT No.: PCT/FR2009/051438
§ 371 (c)(1),
(2), (4) Date: Feb. 1, 2011

(87) PCT Pub. No.: WO2010/015764
PCT Pub. Date: Feb. 11, 2010

(65) Prior Publication Data
US 2011/0138853 A1 Jun. 16, 2011

(30) Foreign Application Priority Data
Aug. 4, 2008 (FR) ...................................... 08 55399

(51) Int. Cl.
*F25J 3/02* (2006.01)
*C01B 3/38* (2006.01)

(52) U.S. Cl.
CPC ............... *F25J 3/0223* (2013.01); *C01B 3/382* (2013.01); *C01B 3/384* (2013.01); *F25J 3/0233* (2013.01); *F25J 3/0242* (2013.01); *F25J 3/0252* (2013.01);
(Continued)

(58) Field of Classification Search
CPC ..... F25J 3/0261; F25J 2210/18; F25J 3/0271; F25J 3/0252; F25J 2215/14
USPC ................... 62/920, 931, 932, 617, 618, 620; 20/625
See application file for complete search history.

(56) References Cited

U.S. PATENT DOCUMENTS 3,780,534 A * 12/1973 Lofredo et al. ................. 62/623
3,965,253 A * 6/1976 Miller et al. ................... 423/652
(Continued)

FOREIGN PATENT DOCUMENTS

DE  3741906  6/1989
WO  2007018505  2/2007
(Continued)

OTHER PUBLICATIONS

Singapore Written Opinion, Application No. 201100801-8, issued Jan. 30, 2012 Austrian Patent Office.
(Continued)

*Primary Examiner* — Frantz Jules
*Assistant Examiner* — Brian King
(74) *Attorney, Agent, or Firm* — Justin K. Murray; Elwood L. Haynes

(57) ABSTRACT

A process and to an apparatus for the generation and separation of a mixture of hydrogen and carbon monoxide is provided.

23 Claims, 6 Drawing Sheets

(52) U.S. Cl.
CPC ......... *F25J 3/0261* (2013.01); *B01D 2257/502* (2013.01); *B01D 2257/7022* (2013.01); *C01B 2203/0233* (2013.01); *C01B 2203/0244* (2013.01); *C01B 2203/042* (2013.01); *C01B 2203/046* (2013.01); *C01B 2203/0475* (2013.01); *C01B 2203/0485* (2013.01); *C01B 2203/0495* (2013.01); *C01B 2203/1241* (2013.01); *C01B 2203/1258* (2013.01); *C01B 2203/142* (2013.01); *C01B 2203/143* (2013.01); *C01B 2203/147* (2013.01); *F25J 2205/04* (2013.01); *F25J 2205/30* (2013.01); *F25J 2210/04* (2013.01); *F25J 2210/06* (2013.01); *F25J 2210/60* (2013.01); *F25J 2235/60* (2013.01); *F25J 2245/02* (2013.01); *F25J 2200/94* (2013.01)
USPC .......................................................... 62/617

(56) References Cited

U.S. PATENT DOCUMENTS

| | | | | |
|---|---|---|---|---|
| 4,460,553 | A * | 7/1984 | Deschamps et al. | 423/219 |
| 5,232,467 | A * | 8/1993 | Child et al. | 48/127.3 |
| 6,289,693 | B1 * | 9/2001 | O'Brien | 62/624 |
| 6,578,377 | B1 | 6/2003 | Licht et al. | |
| 7,427,388 | B2 * | 9/2008 | Garg et al. | 423/653 |
| 8,728,183 | B2 * | 5/2014 | Reiling et al. | 48/197 R |
| 2005/0047995 | A1 | 3/2005 | Wylie | |
| 2005/0232854 | A1 | 10/2005 | Dumont et al. | |
| 2007/0056319 | A1 | 3/2007 | Billy et al. | |
| 2007/0245630 | A1 | 10/2007 | Klein et al. | |
| 2009/0133437 | A1 * | 5/2009 | Reyneke et al. | 62/617 |

FOREIGN PATENT DOCUMENTS

WO       2007018518       2/2007
WO    WO 2007134727 A1 * 11/2007

OTHER PUBLICATIONS

Dr. Ralph Berninger, Progress in H2/CO Low Temperature Separation, Berichte Aus Technik Und Wissenschaft, Linde AG, Wiesbaden, DE, vol. 62, Jan. 1, 1988.

PCT ISR and Written Opinion for PCT/FR2009/051438.

Berninger, R., "Fortschritte Bei Der H2/CO—Tieftemperaturzerlegung/Progress in H2/CO Low Temperature Separation" Berichte Aus Technik Und Wissenschaft, Linde Ag., Wiesbaden, DE, vol. 62, Jan. 1, 1988, pp. 18-32, XP009046782, ISSN: 0942-332X, p. 20, col. 3, paragraph 4, p. 21, col. 1, paragraph 1; figure 6.

* cited by examiner

PROCESS FOR GENERATING AND SEPARATING A HYDROGEN-CARBON MONOXIDE MIXTURE BY CRYOGENIC DISTILLATION

This application is a §371 of International PCT Application PCT/FR2009/051438, filed Jul. 20, 2009.

FIELD OF THE INVENTION

The present invention relates to a process and to an apparatus for the generation and separation of a mixture of hydrogen and carbon monoxide.

BACKGROUND

The units for the production of carbon monoxide and hydrogen can be separated into two parts:
  generation of syngas (mixture comprising $H_2$, CO, $CH_4$, $CO_2$, Ar, $H_2O$ and $N_2$ essentially). Among the various industrial routes for the production of syngas, those based on partial oxidation of natural gas, on autothermal reforming or on coal gasification can prove to be advantageous when the $H_2$/CO production ratio is low (less than approximately 3).
  purification of syngas. The following are found:
    a unit for scrubbing with a liquid solvent in order to remove most of the acid gases present in the syngas,
    a unit for purification on a bed of adsorbents,
    a unit for separation by the cryogenic route, referred to as "cold box", for the production of CO.

In the case of a syngas resulting from a partial oxidation reactor, from an autothermal reactor or from a reactor for the gasification of coal or of heavy hydrocarbon feedstocks, the residual methane content in the syngas at the inlet of the cold box is too low for a process of the scrubbing with methane type; the $CH_4$ contents can be of the order of 0.1% in the case of a coal gasification or else of the order of 0.9% in the case of a partial oxidation or autothermal reactor, whereas the minimum content at the inlet of the cold box is generally in the vicinity of 2%. In this case, the conventional cryogenic process for the purification of a syngas (CO cold box) is a partial condensation.

All the percentages in this document are molar percentages.

In the context of a combined production of pure hydrogen and CO under pressure, the partial condensation process has disadvantages in comparison with the scrubbing with methane:
  the partial condensation does not make it possible to produce pure hydrogen with a low CO content without PSA (for example, the hydrogen comprises approximately 10 ppm of CO when produced by scrubbing with methane, whereas it comprises from 2 to 15% of CO when produced by partial condensation);
  the CO yield of the partial condensation is lower; in order to increase the yield of the partial condensation, it is necessary to invest in a compressor for recycling the waste gases from the partial condensation;
  the methane present in the syngas is only in part found in the methane bleed at the bottom of the tank of the $CO/CH_4$ column. A large amount of methane exits from the cold box with the hydrogen-rich gas at the top of the scrubbing column by thermodynamic equilibrium at the temperature level of the top of the scrubbing column, another amount exiting with the flash gas withdrawn at the stripping column top by thermodynamic equilibrium at the temperature level of the top of the stripping column. In order to ensure a positive material balance of the system for $CH_4$, it is necessary for the amount of $CH_4$ which enters the cold box with the syngas to be greater than the sum of the amounts of $CH_4$ which leave with the hydrogen-rich gas and the flash gas in order to ensure a $CH_4$ bleed which makes it possible to control the system.

The slight traces of $CO_2$ at the outlet of the purification (0.3 ppm) are found dissolved in the tank liquid of the $CO/CH_4$ column. In order to avoid any accumulation of $CO_2$ in the system (in the scrubbing loop), it is necessary for all the $CO_2$ which enters the cold box to leave via the $CH_4$ bleed.

Generally, the $CH_4$ bleed and the scrubbing circuit are withdrawn together at the bottom of the tank of the $CO/CH_4$ column. The $CO_2$ content in the bleed is thus the same as in the scrubbing circuit. As the scrubbing circuit is supercooled to $-180°$ C. in order to optimize the scrubbing, the $CO_2$ content in the scrubbing circuit and thus in the bleed has to be lower than the value of the solubility of $CO_2$ in $CH_4$ at $-180°$ C. in order to avoid solidification of the $CO_2$ in this circuit in the passageways of the exchanger.

Taking into consideration a $CO_2$ content at the outlet of the purification of 0.3 ppm and a value for solubility of $CO_2$ in $CH_4$ at $-180°$ C. of 42 ppm, this defines a maximum level of concentration of $CO_2$, expressed by the ratio of the flow rate of syngas entering the cold box to the $CH_4$ bleed, of 140.

This defines, for a given flow rate of syngas, a minimal value of $CH_4$ content at the inlet of the cold box in order to ensure, simultaneously, an excess $CH_4$ balance and a $CH_4$ bleed for controlling the system and limiting the level of concentration of $CO_2$ in order to prevent solidification of the $CO_2$ in the scrubbing $CH_4$ circuit and thus to prevent blocking of the cryogenic exchanger.

In order to benefit, for a process for the generation of syngas by a partial oxidation or autothermal reactor or else by a reactor for gasification of coal or heavy feedstocks, from the advantages of the process of scrubbing with methane type, the idea is to increase the $CH_4$ content in the syngas at the inlet of the cold box, for example in order to obtain a methane content of at least 1.8% and preferably at least 2% and more advantageously still of 2.3%, and the like.

It is sometimes possible to carry out a methane scrubbing process with a feed gas comprising at least 1.8% of methane, generally possible with a feed gas comprising at least 2% of methane and in any case possible with a feed gas comprising at least 2.3% of methane.

It is very obviously possible to enrich a syngas comprising at most 1.8% of methane in order to obtain a gas comprising at least 2% of methane, indeed even 2.3% of methane, as it is possible a syngas comprising at most 2% of methane in order to obtain a gas comprising at least 2.3% of methane, according to the invention.

It is also a question of introducing solutions for treating the C2+ components which might be present in the syngas.

SUMMARY OF THE INVENTION

According to one subject matter of the invention, provision is made for a process for the generation and separation of syngas in which a syngas is generated from a methane-rich feedstock gas, for example natural gas, the syngas, comprising hydrogen and carbon monoxide, is purified by at least one treatment process to produce a purified syngas and the syngas is separated by cryogenic distillation in a plant comprising at least one column for scrubbing with methane to produce a gas enriched in hydrogen and/or a gas enriched in carbon monoxide, the syngas generated comprising less than 2.3% of methane, preferably less than 2% of methane, indeed even less than 1.8% of methane, and the syngas is enriched upstream of the separation by cryogenic distillation by sending a portion of the feedstock gas to a treatment process downstream of the stage of generation of syngas, without passing through the stage of generation of syngas, to obtain a syngas comprising more than 2.3% of methane if the syngas generated comprises less than 2.3% of methane, or more than 2% of methane if the syngas generated comprises less than 2% of methane, or more than 1.8% of methane if the syngas generated comprises less than 1.8% of methane.

According to other optional aspects:
- the feedstock gas sent to the treatment process downstream of the stage of generation can originate from a prereformer upstream of the stage of generation and/or from a hydrodesulfurization unit upstream of the stage of generation;
- a methane-rich gas, optionally originating from an external source, is sent downstream of the stage of generation of syngas and upstream of the stage of separation by cryogenic distillation;
- the methane-rich gas is sent to a treatment process upstream of the stage of separation by cryogenic distillation;
- a flow enriched in methane originating from the cryogenic distillation process is sent, optionally after pressurization, downstream of the stage of generation of syngas;
- a flow enriched in methane originating from the cryogenic distillation process is sent to a process for treatment of the syngas;
- the processes for treatment of the syngas comprise at least one of the following processes: removal of acid gases, drying, adsorption of carbon dioxide;
- a methane-rich fluid is withdrawn a few theoretical plates above the tank of a $CO/CH_4$ column, optionally in order to act as methane-rich gas to be sent, optionally after pressurization, downstream of the stage of generation of syngas, and a tank liquid is withdrawn from the $CO/CH_4$ column in order to act as bleed;
- a methane-rich fluid is withdrawn a few theoretical plates above the tank of a $CO/CH_4$ column, optionally in order to be used for scrubbing at the top of the column for scrubbing with methane, and a tank liquid is withdrawn from the $CO/CH_4$ column in order to act as bleed;
- the bleed liquid is mixed with a liquid rich in heavy hydrocarbons which is obtained by separation from the syngas in the cryogenic distillation plant.

According to another subject matter of the invention, provision is made for a process for the separation of a syngas comprising heavy hydrocarbons, in which a syngas is purified and cooled and sent to a column for scrubbing with methane, a fluid derived from the tank liquid from the column for scrubbing with methane is sent to a $CO/CH_4$ column, a first methane-rich liquid is withdrawn a few theoretical plates above the tank of the $CO/CH_4$ column, a first portion of the first liquid is sent to the column for scrubbing with methane and a second portion of the first liquid is evaporated, and a second liquid comprising heavy hydrocarbons is taken out of the tank of the $CO/CH_4$ column as bleed.

According to another subject matter of the invention, provision is made for an apparatus for the generation and separation of syngas, comprising a unit for generation of a syngas from a feedstock gas, a unit for purification of syngas comprising hydrogen and carbon monoxide by at least one treatment process to produce a purified syngas and a unit for separation of the syngas by cryogenic distillation comprising at least one column for scrubbing with methane to produce a gas enriched in hydrogen and/or a gas enriched in carbon monoxide, the unit for generation of syngas being adjusted in order to generate a syngas comprising less than 2.3% of methane, preferably less than 2% of methane, indeed even less than 1.8% of methane, and in that it comprises means for enriching the syngas upstream of the unit for separation by cryogenic distillation in order to obtain a syngas comprising more than 2.3% of methane if the syngas generated comprises less than 2.3% of methane, or more than 2% of methane if the syngas generated comprises less than 2% of methane, or more than 1.8% of methane if the syngas generated comprises less than 1.8% of methane, the enriching means comprising means for sending a portion of the feedstock gas to a treatment process downstream of the stage of generation of syngas, without passing through the stage of generation of syngas.

According to other optional aspects, the apparatus comprises:
- means for sending the portion of the feedstock gas taken downstream of a prereformer upstream of the stage of generation;
- means for sending the portion of the feedstock gas taken downstream of a hydrodesulfurization unit upstream of the stage of generation;
- means for sending a methane-rich gas, optionally originating from an external source, downstream of the stage of generation of syngas and upstream of the stage of separation by cryogenic distillation;
- means for sending a flow enriched in methane originating from the process of cryogenic distillation to a process of treatment of the syngas;
- means for sending the methane-rich gas to a treatment process upstream of the stage of separation by cryogenic distillation;
- means for sending a flow enriched in methane originating from the cryogenic distillation process, optionally after pressurization, downstream of the stage of generation of syngas;
- units for treatment of the syngas comprising at least one of the following units: unit for removal of acid gases, drying unit, unit for adsorption of carbon dioxide;
- means for withdrawing a methane-rich fluid a few theoretical plates above the tank of a $CO/CH_4$ column, optionally in order to act as methane-rich gas to be sent, optionally after pressurization, downstream of the stage of generation of syngas, and means for withdrawing a tank liquid from the $CO/CH_4$ column in order to act as bleed;
- means for withdrawing a methane-rich fluid a few theoretical plates above the tank of a $CO/CH_4$ column, optionally in order to be used for scrubbing at the top of the column for scrubbing with methane, and means for withdrawing a tank liquid from the $CO/CH_4$ column in order to act as bleed;
- means for mixing the bleed liquid with a liquid rich in heavy hydrocarbons which is obtained by separation from the syngas in the cryogenic distillation plant;
- means for sending a portion of the feedstock gas sent to a unit for removal of acids downstream of the stage of generation, without passing through the unit for generation of syngas;
- means for sending a portion of the feedstock gas sent to an adsorption unit downstream of the stage of generation, without passing through the unit for generation of syngas.

According to another subject matter of the invention, provision is made for an apparatus for the separation of a syngas comprising heavy hydrocarbons comprising means for purifying and cooling a syngas, means for sending the purified and cooled gas to a column for scrubbing with methane, means for sending a fluid derived from the tank liquid from the column for scrubbing with methane to a $CO/CH_4$ column, means for withdrawing a first methane-rich liquid a few theoretical plates above the tank of the $CO/CH_4$ column, means for sending a first portion of the first liquid to the column for scrubbing with methane and means for evaporating a second portion of the first liquid, and means for taking a second liquid comprising heavy hydrocarbons out of the tank of the $CO/CH_4$ column as bleed.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers.

The solution according to the invention is the injection of a $CH_4$-rich stream into the syngas after the reactor for generation of the syngas and before the column for scrubbing with methane of the cold box.

Examples

Figure 1:
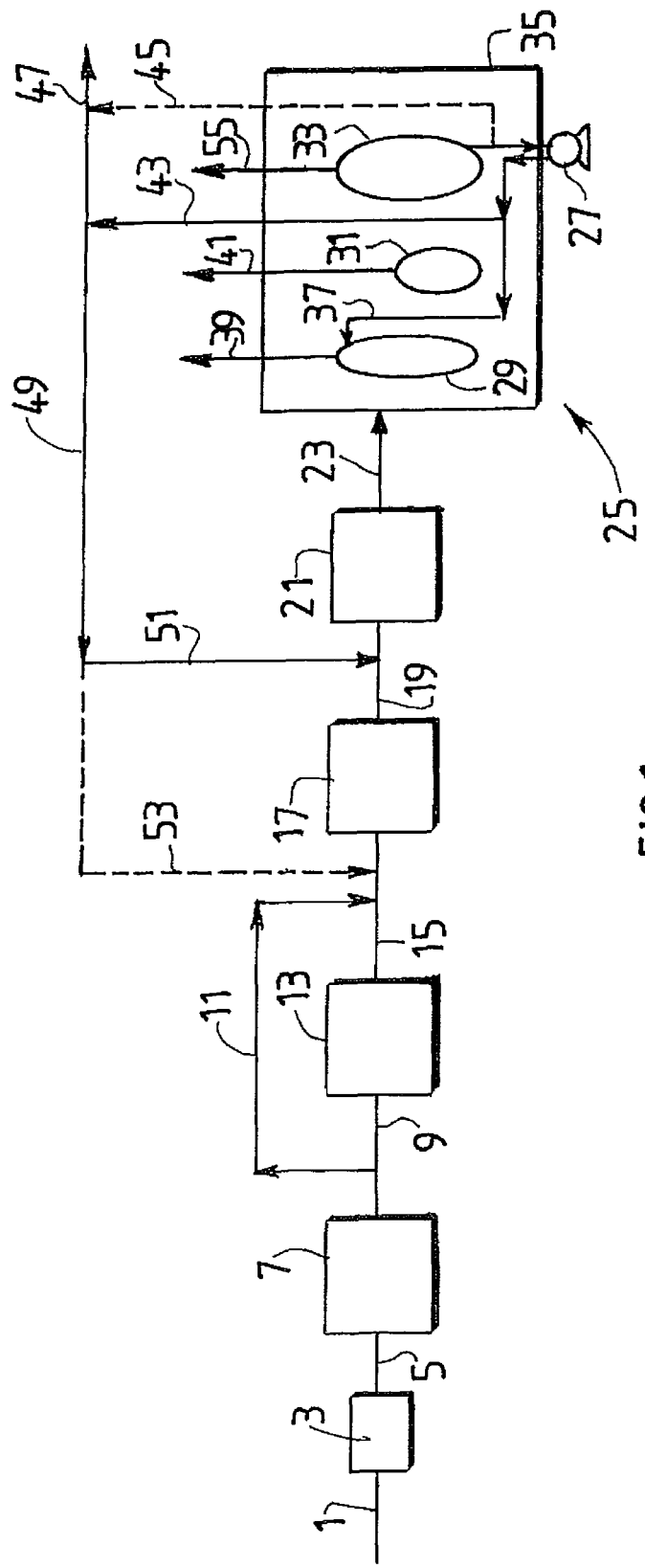
FIG. 1 illustrates a process for the generation and separation of a mixture of carbon monoxide and hydrogen in accordance with one embodiment of the current invention.
Figure 2:
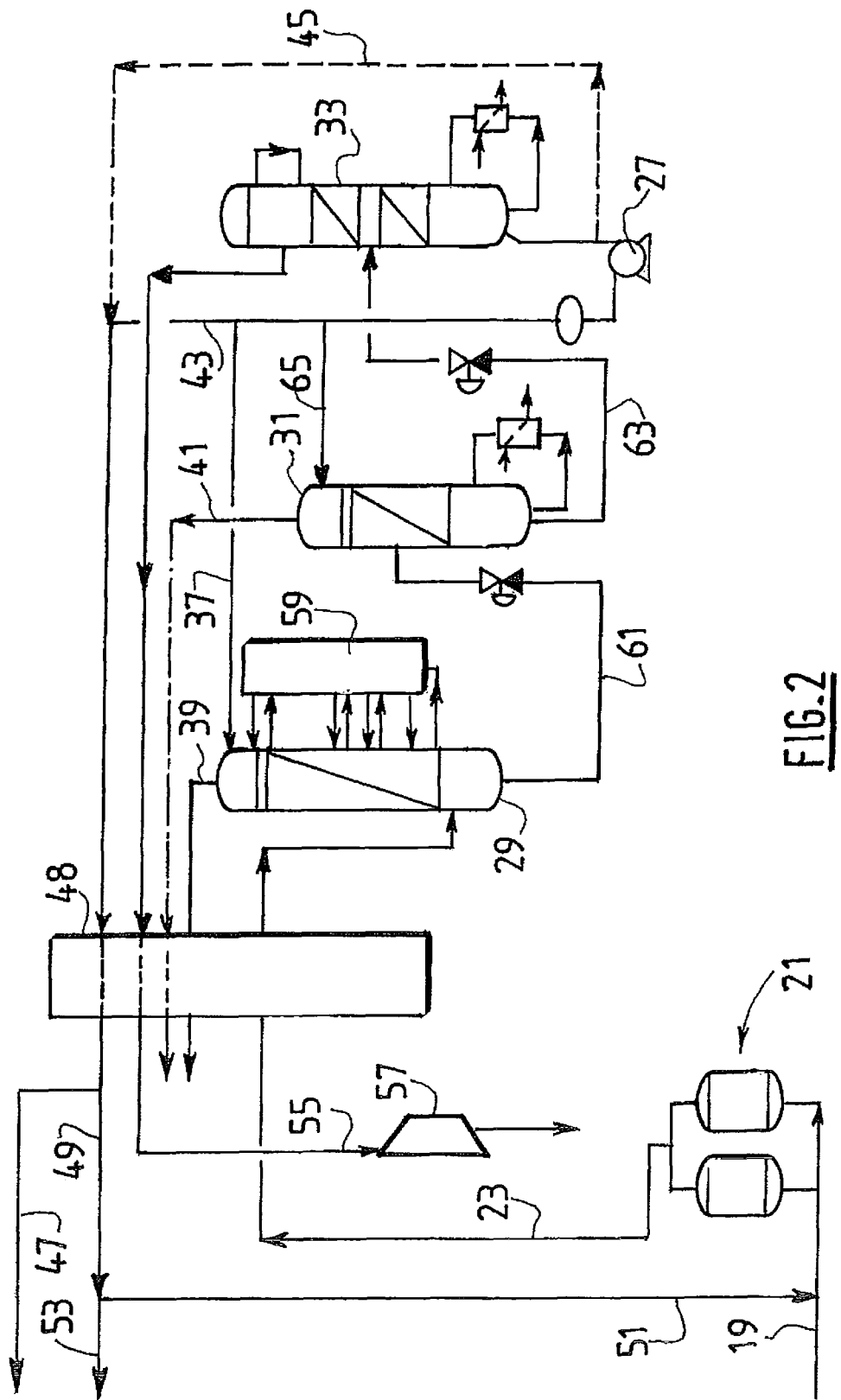
FIG. 2 illustrates another embodiment of the present invention.

1. Recycling of the $CH_4$ Before the Cold Box (FIGS. 1 and 2)

This is applicable in the case where the $CH_4$ content in the syngas (before this $CH_4$ recycling) makes possible a positive $CH_4$ balance in the cold box but exhibits an excessively high level of $CO_2$. In order to lower the level of concentration of $CO_2$, the following are provided:
1. The increase in the discharge pressure of the pumps for $CH_4$ and for $CH_4$ recycle between the cold box and the upstream of the drying in order to limit the level of concentration of $CO_2$ in the material withdrawn from the tank of the $CO/CH_4$ column.
2. The cooling of the top of the scrubbing column in order to reduce the $CH_4$ content for the hydrogen-rich gas.

2. Prereformer with PDX, ATR, SMR (FIG. 1)

Bypassing the reactor between the outlet of the prereformer and the outlet of the reactor (in order to reduce the content of C2+ components in the syngas at the inlet of the cold box, (all the C2+ components of the natural gas feeding the prereformer being converted to $CH_4$ in the prereformer) provides a positive material balance in the process for scrubbing with methane, a portion of the feedstock at the prereformer outlet being directly injected downstream of the reactor.
1. The increase in the discharge pressure of the pumps for $CH_4$ and for $CH_4$ recycle between the cold box and the upstream of the drying makes it possible to limit the level of concentration of $CO_2$ in the material withdrawn from the tank of the $CO/CH_4$ column.
2. The cooling at the top of the scrubbing column makes it possible to reduce the $CH_4$ content in the hydrogen-rich gas.

Figure 3:
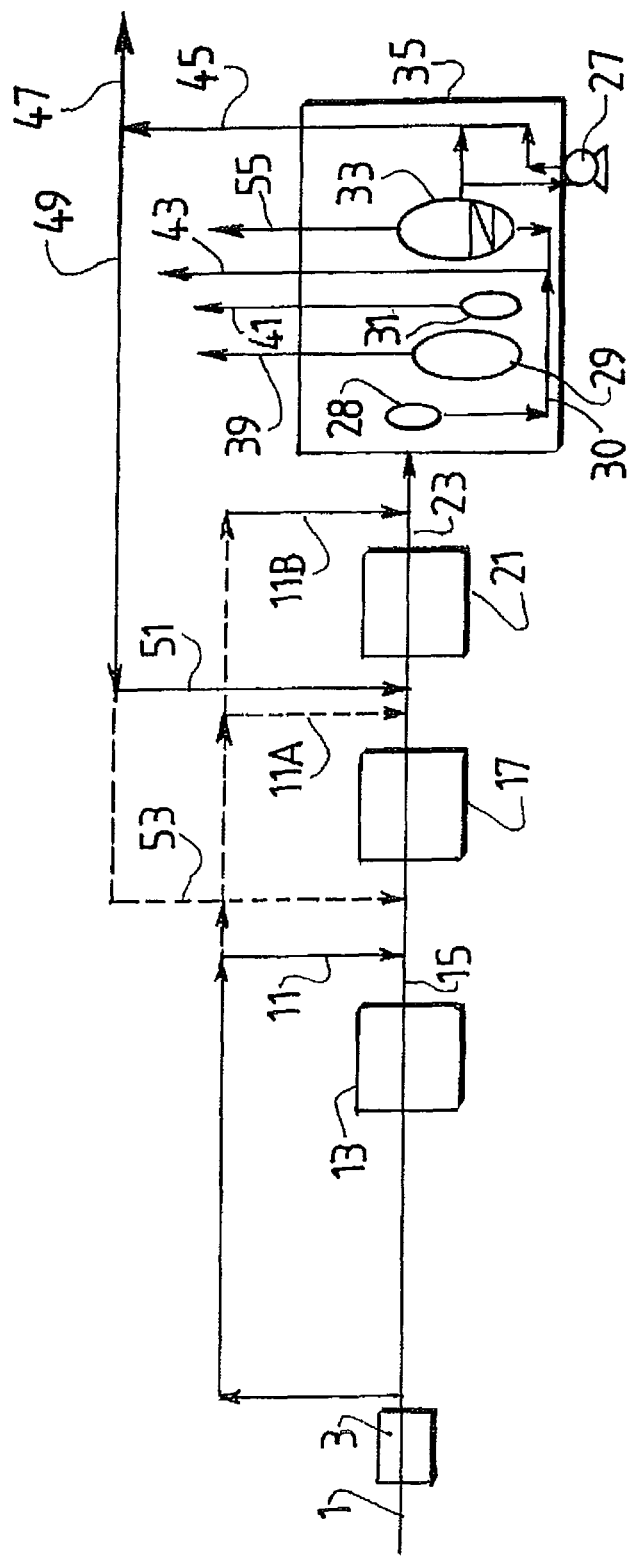
FIG. 3 illustrates a process for the generation and separation of a mixture of carbon monoxide and hydrogen in accordance with one embodiment of the current invention.

3. Reactor without Prereformer (PDX, ATR, SMR) and with HDS (FIG. 3)

By bypassing the reactor between the outlet of the hydrodesulfurization (HDS) unit and the outlet of the reactor, in order to provide a positive material balance in the process of scrubbing with methane, a portion of the feedstock at the outlet of the HDS is directly injected downstream of the reactor.

Injection of the bypass fluid takes place after the reactor and before the scrubbing column:
a) if the bypassed fluid comprises $CO_2$, provision is made for the injection of this fluid between the outlet of the reactor and before the removal of acid gases,
b) if the bypassed fluid comprises a very small amount of $CO_2$ (<50 vpm), provision is made for the injection of this fluid between the outlet of the reactor and before the adsorbers of the drying,
c) if the bypassed fluid does not comprise any $CO_2$ or $H_2O$ at all, provision is made for the injection of this fluid between the outlet of the reactor and before the column for scrubbing with methane.

The increase in the discharge pressure of the pumps for $CH_4$ and for $CH_4$ recycle between the cold box and the upstream of the drying makes it possible to limit the level of concentration of $CO_2$ in the $CH_4$ bleed.

A vessel for two-phase separation in the cold box at a temperature level of approximately −145° C. removes the C3+ components and prevents them from solidifying when the syngas is cooled to colder temperature levels in the exchange line.

The addition of a supplementary section in the tank of the $CO/CH_4$ distillation column is sometimes necessary. The $CH_4$ bleed is withdrawn at the column tank and comprises the C2 component.

The withdrawal at the top of this tank section of the flow for scrubbing with $CH_4$ and of the $CH_4$ recycle is used (comprising little C2 component, it being possible for a high content of C2 component in the scrubbing circuit to bring about phenomena of foaming or other phenomena and to result in poor operation of the scrubbing column).

The cooling of the top of the scrubbing column makes it possible to reduce the $CH_4$ content in the hydrogen-rich gas.

Figure 5:
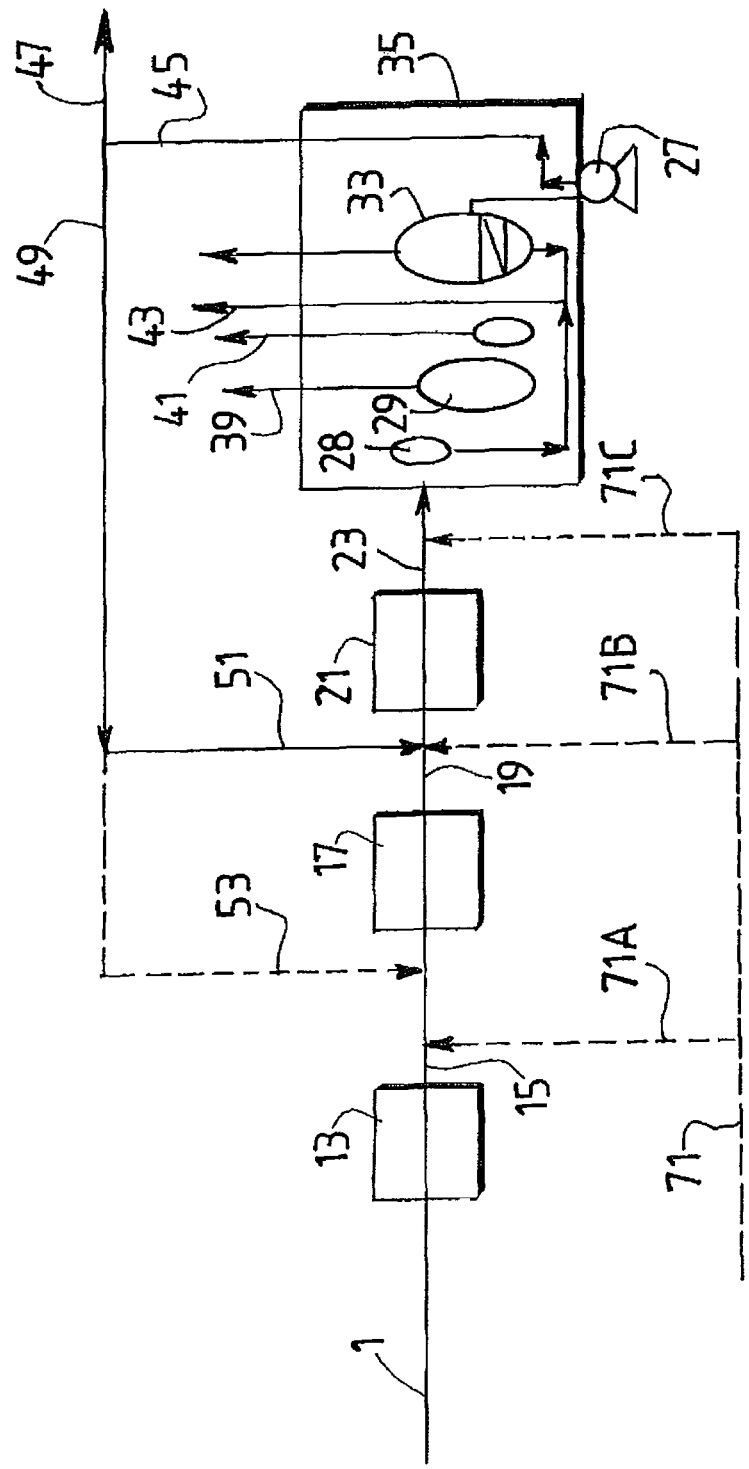
FIG. 5 illustrates a process for the generation and separation of a mixture of carbon monoxide and hydrogen in accordance with one embodiment of the current invention.

4. Injection of $CH_4$-Rich Gas External to the Unit for Generation of Syngas (FIG. 5)

1. The injection of a methane-rich gas (not comprising $CO_2$) after the outlet of the reactor and before the column for scrubbing with methane is provided (if with $CO_2$, injection as at §3-2).
2. The increase in the discharge pressure of the pumps for $CH_4$ and for $CH_4$ recycle between the cold box and the upstream of the drying makes it possible to limit the level of concentration of $CO_2$ in the $CH_4$ bleed.

3. A vessel for two-phase separation in the cold box at a temperature level of approximately −145° C. removes the C3+ components and prevents them from solidifying when the syngas is cooled to colder temperature levels in the exchange line (in the case of the presence of C2+ components).

4. The addition of a supplementary section in the tank of the $CO/CH_4$ distillation column. The $CH_4$ bleed is withdrawn at the column tank and comprises a C2 component, it being possible for a high C2 content in the scrubbing circuit to bring about phenomena of foaming or other phenomena and to result in poor operation of the scrubbing column.

5. The withdrawal at the top of this tank section of the flow for scrubbing with $CH_4$ and of the $CH_4$ recycle is required (comprising little C2 component).

6. The cooling of the top of the scrubbing column makes it possible to reduce the $CH_4$ content in the hydrogen-rich gas.

Figure 6:
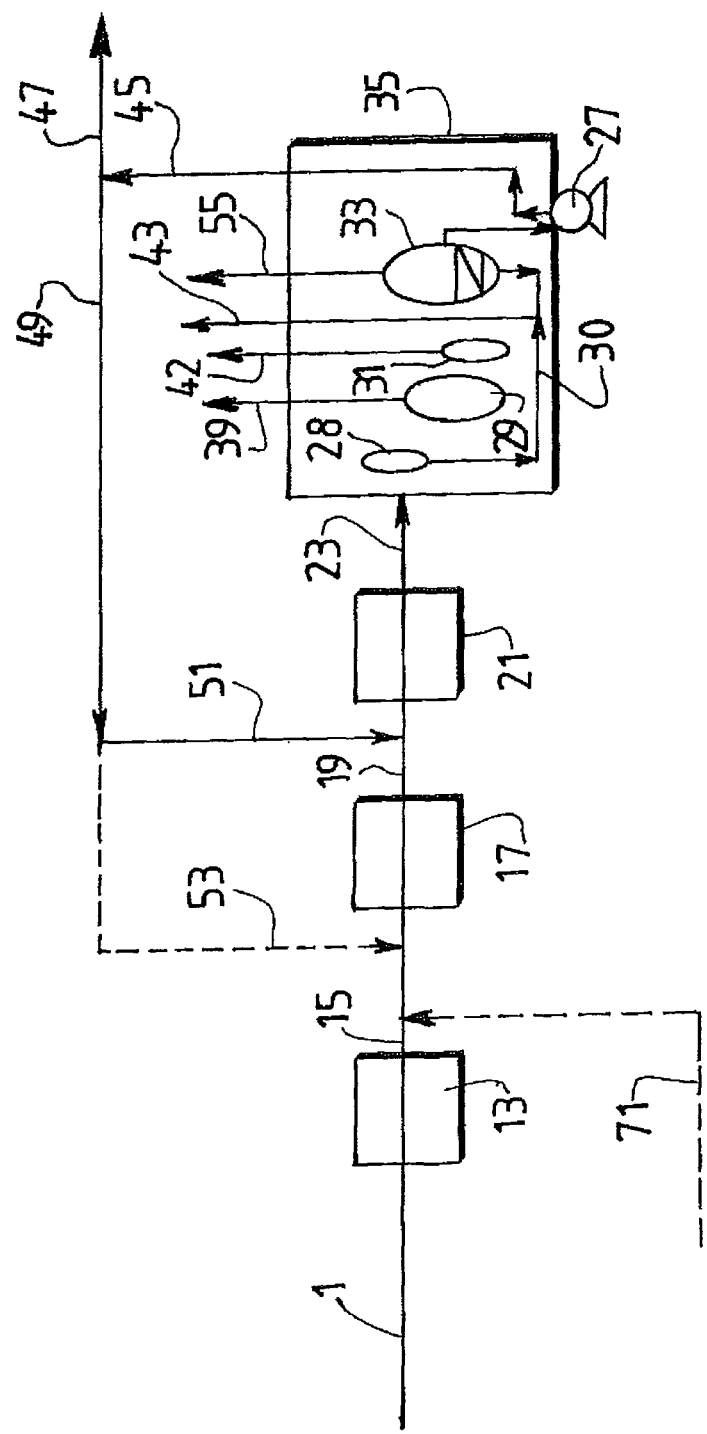
FIG. 6 illustrates a process for the generation and separation of a mixture of carbon monoxide and hydrogen in accordance with one embodiment of the current invention.

5. Importation of Nondesulfurized Rich $CH_4$ (ex. Natural Gas) After the Reactor but Before the Decarbonation and Removal of the $CO_2$ and of the Sulfur in the Decarbonation Unit (FIG. 6)

Figure 4:
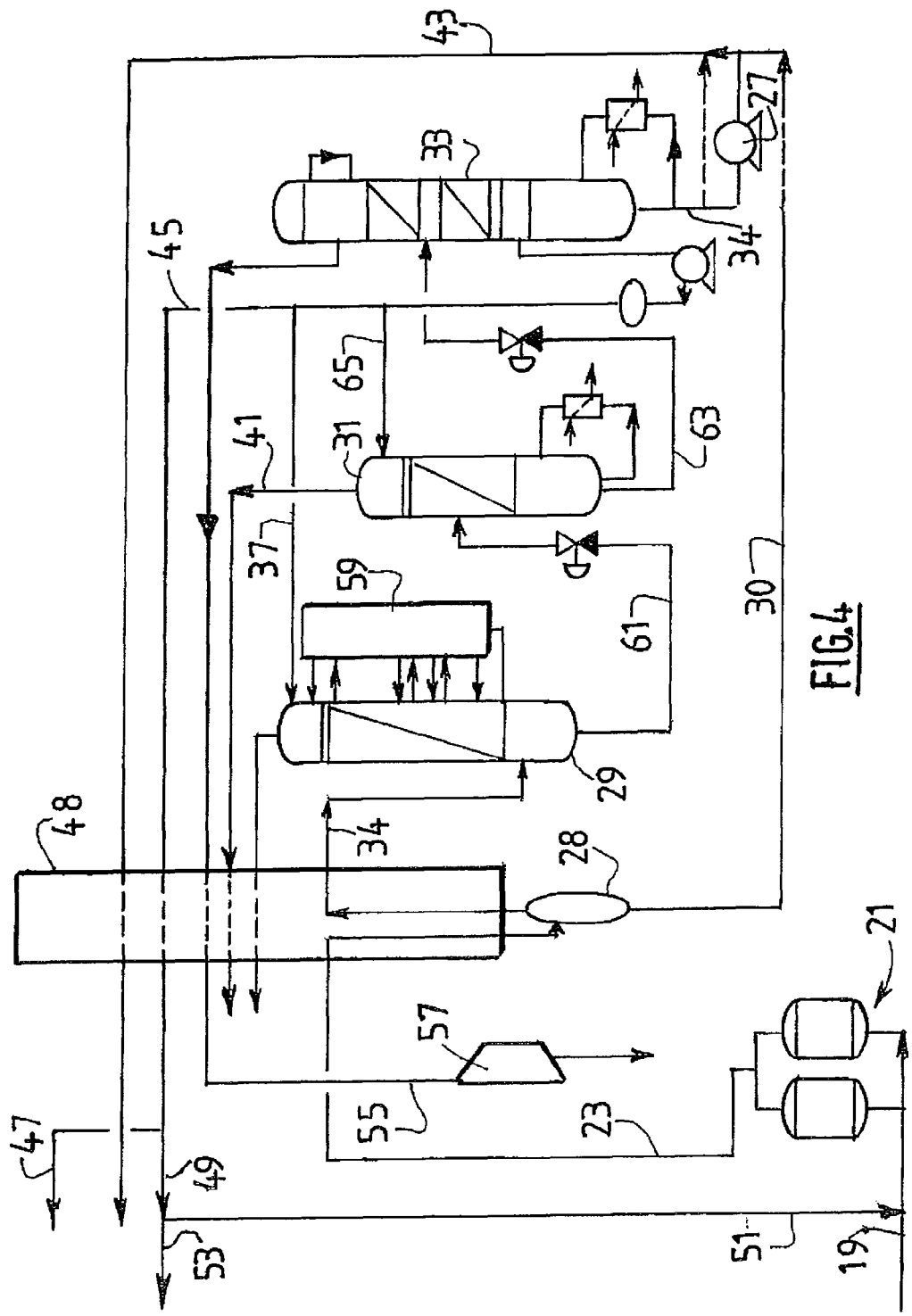
FIG. 4 illustrates another embodiment of the present invention.

The processes and apparatuses according to the invention will be described in more detail with reference to the figures, in which FIGS. 1, 3, 5 and 6 represent a process for the generation and separation of a mixture of carbon monoxide and hydrogen according to the invention and FIGS. 2 and 4 show the breakdown of the process for separation of a mixture of carbon monoxide and hydrogen suitable for incorporation therein.

FIG. 1 shows a process in which a feedstock gas 1, which can be a methane-rich gas, such as natural gas, is sent to a hydrodesulfurization (HDS) unit 3.

The gas produced 5 is sent to a prereformer 7. At the outlet of the prereformer, the gas is composed essentially of $CH_4$, the C2+ components are converted to $CH_4$ and the $CH_4$ is only very slightly converted to syngas.

The gas exiting from the prereformer is separated in order to form a bypassing flow 11 and a flow 9. The flow 9 is sent to the reactor 13 of the SMR or ATR type, and the like, in order to produce a syngas 15 comprising less than 2.3% of methane, preferably less than 2% of methane, indeed even less than 1.8% of methane, with which the bypassing flow 11 is mixed. The mixture is sent to the unit for removal of acid gases 17, in order to produce a purified gas 19. The purified gas 19 is sent to an adsorption unit 21 in order to be dried and purified from $CO_2$, in order to form a gas 23. The gas 23 is cooled and sent to a cryogenic distillation unit 35 operating by scrubbing with methane. This unit is illustrated in more detail in FIG. 2. It comprises a column for scrubbing with methane 29, a stripping column 31 and a $CO/CH_4$ separation column 33 inside a cold box 35. Liquid methane is withdrawn at the tank of the $CO/CH_4$ column 33, evaporated, optionally after pumping by the pump 27, and taken out of the cold box as flow 43 and/or 45. The pump 27 can also be used to send methane 37 to the column for scrubbing with methane 29.

A portion 47 of the methane can act as bleed and the remainder 49 can be recycled, optionally after compression, upstream or downstream of the unit for removal of acid gases as flow 51 or 53.

In this way, the methane content of the flow 15 on arriving in the removal unit 17 rises to at least 1.8% of methane, preferably at least 2% of methane, indeed even 2.3% of methane.

Hydrogen-rich gases 39, 41 are produced by the scrubbing column 29 and the stripping column 31.

In FIG. 2, the purified gas 19 is sent to the adsorption unit 21 of FIG. 1 in order to be dried and purified from $CO_2$, in order form a gas 23. The gas 23 is cooled and sent to a cryogenic distillation unit 35 operating by scrubbing with methane. It comprises a column for scrubbing with methane 29, a stripping column 31 and a $CO/CH_4$ separation column 33 inside a cold box. The gas 23 is cooled in the exchanger 48 and is sent to the tank of the column for scrubbing with methane 29. The tank liquid 61 from this column 29 is sent to the stripping column 31 and the tank liquid 63 from the stripping column is sent to an intermediate point of the $CO/CH_4$ column 33. Liquid methane is withdrawn at the tank of the $CO/CH_4$ column 33, evaporated in the exchanger 48, optionally after pumping by the pump 27, and taken out of the cold box as flow 49. The pump 27 can also be used to send methane 37 to the column for scrubbing with methane 29 and methane 65 to the top of the stripping column 31.

The flow 49 is recycled, optionally after compression, upstream or downstream of the unit for removal of acid gases as flow 51 or 53.

Hydrogen-rich gases 39, 41 are produced by the scrubbing column 29 and the stripping column 31.

A gas or a liquid 55 rich in carbon monoxide is withdrawn at the top of the $CO/CH_4$ column, heated (and optionally evaporated) in the exchanger 48 and optionally compressed in a compressor 57 in order to form the product.

FIG. 3 shows a process in which the syngas is produced by a reactor 13 of PDX, ATR or SMR type without prereformer and with HDS in which a methane-rich feedstock gas 1, which can be natural gas, is sent to a hydrodesulfurization unit 3. The gas produced is divided into two, one portion 5 being sent to a reactor 13. The remainder of the gas forms a bypassing flow. The reactor 13 produces a syngas 15 comprising less than 2.3% of methane, preferably less than 2% of methane, indeed even less than 1.8% of methane, with which the bypassing flow 11 is mixed if this flow comprises $CO_2$. The mixture is sent to the unit for removal of acid gases 17 in order to produce a purified gas 19. The bypassing flow 11A can be mixed therewith if it comprises less than 50 vpm of $CO_2$. The purified gas 19 is sent to an adsorption unit 21 in order to be dried and purified from $CO_2$, in order to form a gas 23. The bypassing flow 11B can be mixed therewith if it does not comprise any $CO_2$ at all. The gas 23 is cooled and sent to a cryogenic distillation unit 35 operating by scrubbing with methane. This unit is illustrated in more detail in FIG. 2. It comprises a separation vessel 28 in order to remove the C3+ components, a column for scrubbing with methane 29, a stripping column 31 and a $CO/CH_4$ separation column 33 inside a cold box 35. Liquid methane is withdrawn a few stages above the tank of the $CO/CH_4$ column 33, evaporated, optionally after pumping by the pump 27, and taken out of the cold box as flow 45. The pump 27 can also be used to send methane 37 to the column for scrubbing with methane 29.

A portion 47 of the methane can be used as bleed and the remainder 49 can be recycled, optionally after compression, upstream or downstream of the unit for removal of acid gases as flow 51 or 53. In this way, the methane content of the flow 15 on arriving in the removal unit 17 rises to at least 1.8% of methane, preferably at least 2% of methane, indeed even 2.3% of methane.

Hydrogen-rich gases 39, 41 are produced by the scrubbing column 29 and the stripping column 31. A methane-rich fluid comprising C2 components is withdrawn from the tank of the CO/CH$_4$ column 33 and mixed with the fluid rich in C3+ components 30 originating from the vessel 28, and the mixture 43 is taken out of the cold box.

In FIG. 4, the purified gas 19 is sent to the adsorption unit 21 of FIG. 3 in order to be dried and purified from CO$_2$, in order to form a gas 23. The gas 23 is cooled and sent to a cryogenic distillation unit 25 operating by scrubbing with methane. It comprises a column for scrubbing with methane 29, a stripping column 31 and a CO/CH$_4$ separation column 33 inside a cold box. The gas 23 is partially cooled in the exchanger 48 and is sent to a separation vessel 28. The gas produced 34 is sent to the tank of the column for scrubbing with methane 29. The tank liquid 61 from this column 29 is sent to the stripping column 31 and the tank liquid 63 from the stripping column is sent to an intermediate point of the CO/CH$_4$ column 33. Liquid methane is withdrawn a few stages above the tank of the CO/CH$_4$ column 33, evaporated in the exchanger 48, optionally after pumping by the pump 27, and taken out of the cold box as flow 49. The pump 27 can also be used to send methane 37 to the column for scrubbing with methane 29 and methane 65 to the top of the stripping column 31.

The fluid 34, which is the tank methane from the column 33, can be pumped by the pump 27 before being mixed with the liquid 30 originating from the vessel 28 and the mixture 43 is sent to the exchanger 48 and can be used subsequently as fuel.

A portion of the flow 49 is recycled, optionally after compression, upstream or downstream of the unit for removal of acid gases as flow 51 or 53. Optionally, a portion of the methane composed of the fluid 47 can be used as fuel.

A gas or a liquid 55 rich in carbon monoxide is withdrawn at the top of the CO/CH$_4$ column, heated (and optionally evaporated) in the exchanger 48 and optionally compressed in a compressor 57 in order to form the product.

Hydrogen-rich gases 39, 41 are produced by the scrubbing column 29 and the stripping column 31.

FIG. 5 shows a process in which a methane-rich feedstock gas 1, which can be natural gas, is sent to a hydrodesulfurization unit 3 (not illustrated). The gas produced is sent to a reactor 13. The reactor 13 produces a syngas 15 comprising less than 2.3% of methane, preferably less than 2% of methane, indeed even less than 1.8% of methane. The syngas or the mixture of syngas with other gases is sent to the unit for removal of acid gases 17 in order to produce a purified gas 19. The purified gas 19 is sent to an adsorption unit 21 in order to be dried and purified from CO$_2$, in order to form a gas 23. The gas 23 is cooled and sent to a cryogenic distillation unit 35 operating by scrubbing with methane. This unit is illustrated in more detail in FIG. 4. It comprises a separation vessel 28 in order to remove the C3+ components, a column for scrubbing with methane 29, a stripping column 31 and a CO/CH$_4$ separation column 33 inside a cold box 35. Liquid methane is withdrawn a few stages above the tank of the CO/CH$_4$ column 33, evaporated, optionally after pumping by the pump 27, and taken out of the cold box as flow 45. The pump 27 can also be used to send methane 37 to the column for scrubbing with methane 29.

A methane-rich gas 71 originating from an external source can be mixed, either as flow 71A with the flow produced by the reactor 13, or as flow 71B with the flow 19 originating from the unit for removal of acid gases 17, or as flow 71C with the flow 23 produced by the adsorption unit 21.

A portion 47 of the methane can be used as product and the remainder 49 can be recycled, optionally after compression, upstream or downstream of the unit for removal of acid gases as flow 51 or 53.

In this way, the methane content of the flow 15 on arriving in the removal unit 17 or on arriving in the adsorption unit 21 or on arriving in the cold box 35 rises to at least 1.8% of methane, preferably at least 2% of methane, indeed even 2.3% of methane.

Hydrogen-rich gases 39, 41 are produced by the scrubbing column 29 and the stripping column 31. A methane-rich fluid comprising C2 components is withdrawn from the tank of the CO/CH$_4$ column 33 and mixed with the fluid rich in C3+ components 30 originating from the vessel 28, and the mixture 43 is taken out of the cold box as bleed.

FIG. 6 shows a process in which a methane-rich feedstock gas 1, which can be natural gas, is sent to a hydrodesulfurization unit 3 (not illustrated). The gas produced is sent to a reactor 13. The reactor 13 produces a syngas 15 comprising less than 2.3% of methane, preferably less than 2% of methane, indeed even less than 1.8% of methane. The mixture is sent to a unit for removal of acid gases 17 in order to produce a purified gas 19. The purified gas 19 is sent to an adsorption unit 21 in order to be dried and purified from CO$_2$, in order to form a gas 23. The gas 23 is cooled and sent to a cryogenic distillation unit 35 operating by scrubbing with methane. This unit is illustrated in more detail in FIG. 4. It comprises a separation vessel 28 for removing the C3+ components, a column for scrubbing with methane 29, a stripping column 31 and a CO/CH$_4$ separation column 33 inside a cold box 35. Liquid methane is withdrawn a few stages above the tank of the CO/CH$_4$ column 33, evaporated, optionally after pumping by the pump 27, and taken out of the cold box as flow 43 and/or 45. The pump 27 can also be used to send methane 37 to the column for scrubbing with methane 29.

A portion 47 of the methane can be used as product and the remainder 49 can be recycled, optionally after compression, upstream or downstream of the unit for removal of acid gases as flow 51 or 53.

In this way, the methane content of the flow 15 on arriving in the removal unit 17 or on arriving in the adsorption unit 21 rises to at least 1.8% of methane, preferably at least 2% of methane, indeed even 2.3% of methane.

Hydrogen-rich gases 39, 41 are produced by the scrubbing column 29 and the stripping column 31. A methane-rich fluid comprising C2 components is withdrawn from the tank of the CO/CH$_4$ column 33 and mixed with the fluid rich in C3+ components 30 originating from the vessel 28, and the mixture 43 is taken out of the cold box as bleed.

A flow of nondesulfurized natural gas 71 is sent downstream of the reactor 13 and upstream of the unit for removal of acid gases 17. This also makes it possible to increase the methane content and can replace the sending of other methane-rich flows.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the generation and separation of syngas comprising:

a) generating a syngas from a first portion of methane-rich feedstock gas in a syngas generation unit, the syngas comprising hydrogen, carbon monoxide, and less than 2.3% methane;
b) purifying the syngas by at least one treatment process to produce a purified syngas;
c) separating the syngas by cryogenic distillation in a cryogenic distillation plant comprising at least one column for scrubbing with methane to produce a gas enriched in hydrogen and/or a gas enriched in carbon monoxide; and
d) introducing a second portion of the methane-rich feedstock gas to the syngas at a point that is upstream of the separation by cryogenic distillation and downstream syngas generation unit, without passing the second portion of the methane-rich feedstock through the syngas generation unit, to obtain a methane-enriched syngas comprising more than 2.3% of methane.

2. The process of claim 1, wherein the syngas generated comprises less than 2% of methane, and the methane-enriched syngas comprises more than 2% methane.

3. The process of claim 2, wherein the syngas generated comprises less than 1.8% of methane, and the methane-enriched syngas comprises more than 1.8% methane.

4. The process of claim 1, further comprising the step of combining a methane-rich gas with the syngas at a point downstream the syngas generation unit and upstream of the stage of separation by cryogenic distillation.

5. The process of claim 4, wherein said methane-rich gas originates from an external source.

6. The process of claim 4, wherein the methane-rich gas is sent to the treatment process upstream of the stage of separation by cryogenic distillation.

7. The process of claim 1, Wherein the processes for treatment of the syngas comprise at least one of the following processes: removal of acid gases, drying, and adsorption of carbon dioxide.

8. The process of claim 1, further comprising the steps of withdrawing a methane-rich fluid a few theoretical plates above a tank of a CO/CH4 column, and withdrawing a tank liquid from the CO/CH4 column to act as bleed.

9. The process of claim 8, wherein said methane-rich fluid acts as methane-rich gas to be sent downstream of the syngas generation unit.

10. The process of claim 9, further comprising the step of pressurizing the methane-rich gas prior to being sent downstream of the syngas generation unit.

11. The process of claim 8, wherein said methane-rich fluid is used for scrubbing at the top of the column for scrubbing with methane.

12. The process of claim 8, further comprising the step of mixing the bleed with a liquid rich in heavy hydrocarbons which is obtained by separation from the syngas in the cryogenic distillation plant.

13. The process of claim 1, wherein the second portion of the feedstock gas originates from a pre-reformer upstream of the syngas generation unit.

14. The process of claim 1, wherein the second portion of the feedstock gas, originates from a hydrodesulfurization unit upstream of the syngas generation unit.

15. An apparatus for the generation and separation of syngas, comprising:
a) a syngas generation unit configured to generate syngas having less than 2.3% methane from a first portion of a methane-rich feedstock gas;
b) a purification unit configured to purify syngas comprised of hydrogen and carbon monoxide by at least one treatment process to produce a purified syngas;
c) a cryogenic separation unit configured to separate the syngas by cryogenic distillation, the separation unit comprising at least one methane scrubbing column configured to scrub the syngas with methane to produce a gas enriched in hydrogen and/or a gas enriched in carbon monoxide;
d) a means for enriching the syngas upstream of the cryogenic separation unit and downstream the syngas generation unit such that the syngas contains more than 2.3% methane using a second portion of the methane-rich feedstock gas that has not passed through the syngas generation unit.

16. The apparatus of claim 15, wherein said methane-rich feedstock gas is natural gas.

17. The apparatus of claim 15, wherein the syngas generation unit is configured to generate syngas comprising less than 2% of methane, and the means for enriching the syngas upstream of the cryogenic separation unit and downstream the syngas generation unit such that the syngas contains more than 2% of methane.

18. The apparatus of claim 17, wherein the syngas generation unit is configured to generate syngas comprising less than 1.8% of methane, and the means for enriching the syngas upstream of the cryogenic separation unit and downstream the syngas generation unit such that the syngas contains more than 1.8% of methane.

19. The apparatus of claim 15, wherein the second portion of the methane-rich feedstock originates from a prereformer upstream of the syngas generation unit.

20. The apparatus of claim 15, further comprising a hydrodesulthrization (HDS) unit upstream of the syngas generation unit, wherein the HlM unit is in fluid communication with the means for enriching the syngas.

21. The apparatus of claim 15, further comprising a means for sending the second portion of the methane-rich feedstock gas to an acid removal unit configured to remove acids downstream of the syngas generation unit, without passing through the syngas generation unit.

22. The apparatus of claim 15, further comprising a means for sending the second portion of the methane-ricin feedstock gas to an adsorption unit downstream of the syngas generation unit or directly to the cryogenic separation unit, without passing through the syngas generation unit.

23. The process of claim 1, wherein the methane introduced to the syngas during step d) is not converted to syngas between the point the methane is introduced to the syngas and then introduced to the cryogenic distillation plant.

* * * * *